United States Patent
Zhou

(10) Patent No.: US 9,628,711 B2
(45) Date of Patent: Apr. 18, 2017

(54) MOTION SENSOR BASED VIRTUAL TRIPOD METHOD FOR VIDEO STABILIZATION

(75) Inventor: Jianping Zhou, Fremont, CA (US)

(73) Assignee: APPLE INC., Cupertino, CA (US)

( * ) Notice: Subject to any disclaimer, the term of this patent is extended or adjusted under 35 U.S.C. 154(b) by 121 days.

(21) Appl. No.: 13/327,487

(22) Filed: Dec. 15, 2011

(65) Prior Publication Data

US 2013/0155264 A1    Jun. 20, 2013

(51) Int. Cl.
*H04N 5/228*    (2006.01)
*H04N 5/232*    (2006.01)

(52) U.S. Cl.
CPC ..... *H04N 5/23258* (2013.01); *H04N 5/23267* (2013.01)
USPC .................................... 348/208.6; 348/208.4

(58) Field of Classification Search
USPC ........... 348/208.99, 208, 208.3, 208.5, 208.7
See application file for complete search history.

(56) References Cited

U.S. PATENT DOCUMENTS

| | | | |
|---|---|---|---|
| 6,876,926 | B2 | 4/2005 | Kirkland et al. |
| 7,925,051 | B2 * | 4/2011 | Gensolen et al. ............ 382/107 |
| 8,120,661 | B2 * | 2/2012 | Rabinowitz et al. ...... 348/208.6 |
| 8,175,448 | B2 * | 5/2012 | Miyasako ........................ 396/55 |
| 8,264,551 | B2 * | 9/2012 | Kurata et al. .............. 348/208.4 |
| 2003/0076421 | A1 | 4/2003 | Dutta |
| 2003/0197787 | A1 | 10/2003 | Satoh et al. |
| 2007/0296821 | A1 | 12/2007 | Kakkori |
| 2008/0166115 | A1 | 7/2008 | Sachs et al. |
| 2009/0184849 | A1 | 7/2009 | Nasiri et al. |
| 2009/0219401 | A1 * | 9/2009 | Drouot ........................ 348/208.4 |
| 2011/0234825 | A1 | 9/2011 | Liu et al. |
| 2011/0298937 | A1 | 12/2011 | Ogawa et al. |
| 2012/0120264 | A1 * | 5/2012 | Lee et al. ................... 348/208.4 |

FOREIGN PATENT DOCUMENTS

| | | | |
|---|---|---|---|
| CN | 101238712 | A | 8/2008 |
| CN | 101778192 | A | 7/2010 |
| EP | 1 607 792 | A2 | 12/2005 |
| JP | 11-084448 | A | 3/1999 |
| JP | 2007-079598 | A | 3/2007 |
| JP | 2007-243335 | A | 9/2007 |
| KR | 10-2010-0024851 | A | 3/2010 |
| WO | 2007/017840 | A1 | 2/2007 |
| WO | 2010151215 | A1 | 12/2010 |

OTHER PUBLICATIONS

Co-pending U.S. Appl. No. 13/210,060, filed Aug. 15, 2011.
International Search Report and Written Opinion in PCT/US2012/068015, dated Mar. 22, 2013.

* cited by examiner

*Primary Examiner* — Shahbaz Nazrul
(74) *Attorney, Agent, or Firm* — Baker Hostetler LLP; Robert L. Hails

(57) ABSTRACT

An apparatus, method, and computer-readable medium for motion sensor-based video stabilization. A motion sensor may capture motion data of a video sequence. A controller may compute average motion data of the camera used to capture the video sequence based on motion data from the motion sensor. The controller may then determine the difference between the actual camera motion and the average camera motion to set a video stabilization strength parameter for the frames in the video sequence. A video stabilization unit may utilize the strength parameter to stabilize the frames in the video sequence.

60 Claims, 6 Drawing Sheets

400

500

600

MOTION SENSOR BASED VIRTUAL TRIPOD METHOD FOR VIDEO STABILIZATION

BACKGROUND

This disclosure relates generally to the field of image processing. More particularly, but not by way of limitation, this disclosure relates to compensating for unwanted motion experienced during video image capture operations.

Today, many personal electronic devices are equipped with digital cameras that are video capable. Exemplary personal electronic devices include, but are not limited to, mobile telephones, personal digital assistants, portable music players, portable video players, and portable computer systems such as laptops, notebooks and tablet computers. One common problem with video capture is unwanted motion of the camera. While some motion may be desired (e.g., the smooth pan of a camera across a scene), other motion is not (e.g., motion introduced by shaky hands or walking).

Many video capture devices include a gyroscopic sensor that may be used to assist various device functions, including eliminating motion captured by a camera. However, when eliminating motion captured by a camera, it is not always clear if the captured motion is intended or unintended motion. Thus, there is a need for efficient ways to distinguish between intended and unintended motion, so that only unintended motion is eliminated.

DETAILED DESCRIPTION

Embodiments of the present invention provide techniques for stabilizing video frames based on information obtained from a motion sensor. A motion sensor may capture motion data of a video sequence. A controller may compute average motion data of the camera used to capture the video sequence based on motion data from the motion sensor. The controller may then determine the difference between the actual camera motion and the average camera motion to set a video stabilization strength parameter for frames in the video sequence. A video stabilization unit may utilize the strength parameter to stabilize a frame in the video sequence.

Figure 1:
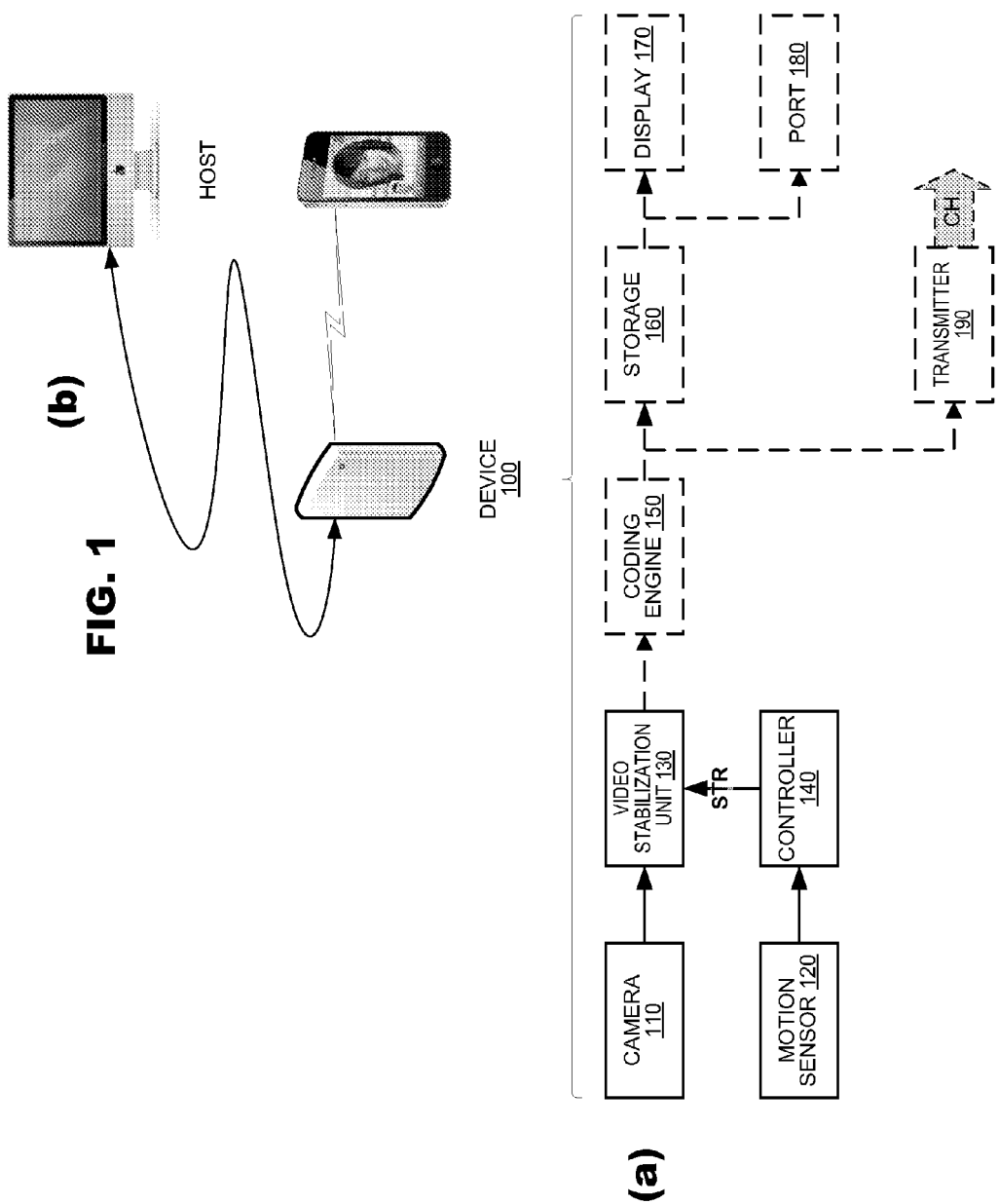
FIG. 1 is a simplified block diagram of a camera-enabled device according to an embodiment of the present invention.

FIG. 1 is a simplified block diagram of a camera-enabled device 100 according to an embodiment of the present invention. The device 100 may include a camera 110, motion sensor 120, video stabilizer 130 and a controller 140 (FIG. 1(a)). The camera 110 may capture visual information and generate video data therefrom. The motion sensor 120 may detect motion of the device 100 (and, by extension the camera 110) and output motion data to the controller 140. The video stabilizer 130 may perform video stabilization techniques on the input video sequence in an attempt to cancel artifacts in the video sequence that arise due to camera motion. The video stabilizer 130 may operate according to a variety of operational parameters (not shown) which may be controlled by a strength parameter supplied to it by the controller 140. The controller 140 may develop the strength parameter based on its interpretation of motion data supplied by the motion sensor.

During operation, the camera 110 may output frames of video of a predetermined size. The video stabilizer 130 may extract image data from the frames at a smaller size in order to compensate for motion detected within the image content. The video stabilizer 130 may then inflate motion compensated frames back to the original size (i.e., the size of the frames output by camera 110). The controller 140 may determine an operational strength for the video stabilizer 130 for each frame of data based on the motion data. The controller 140 may estimate motion of the camera 110 in three dimensions (e.g., pitch/roll/yaw, quaternion units, or x, y, z coordinates).

Video captured by the camera 110 and motion data from the motion sensor 120 may be correlated. The camera 110 and the motion sensor 120 may operate asynchronously. A common clock may be used to timestamp both video data and motion data to facilitate the synchronization of asynchronously captured image and motion data by putting them on a common timeline.

The motion sensor 120 may output data to the controller 140 representing motion of the camera during each frame. Typically, the motion sensor 120 will output multiple samples of data during each frame. In an embodiment, the motion sensor sampling rate may be 200 Hz. Thus, if the camera outputs video data at 30 frames per second, the motion sensor may generate 200/30 samples of motion data for each frame of video. In a further embodiment, the motion sampling rate may be between 50 Hz and 200 Hz. In an embodiment, the motion sensor 120 may be an accelerometer, a digital compass, a MEMS motion sensor device or a gyroscope. The motion sensor 120 may be mounted within a common housing of the camera 110 or on a common board (not shown) as the camera 110 within the device 100.

In FIG. 1, the device 100 is illustrated as a smart phone, but the principles of the present invention are not so limited. Embodiments of the present invention may be applied in a variety of types of devices, including, for example, portable computers, tablet computers, webcams, digital cameras, and/or camcorders. Accordingly, the camera 110 may include a front facing camera or a rear facing camera.

Conventionally, there are storage buffers between each of the components shown in FIG. 1(a). For example, the video stabilization unit 130 may read video data from a buffer and then write stabilized video data to another buffer. Storage buffers may also be present between components of the coding engine (not shown). These buffers aren't illustrated in FIG. 1 for ease of discussion.

Further, the principles of the present invention may be applied in a variety of uses cases. In one use case, video captured by the device 100 may be stored on the device for layer playback. Accordingly, FIG. 1(a) illustrates that the device 100 may include a video coder 150 to compress a video sequence output by the video stabilizer 130 and storage 160 to store the compressed video. In an embodiment, the non-compressed video sequence output by the video stabilizer 130 may be directly stored in storage 160. FIG. 1(a) also illustrates a display 170 on which the video sequence may be rendered following user selection and decompression if necessary (operations not shown).

In another use case, illustrated in FIG. 1(b), the video sequence may be uploaded to a host computer. In this case, the device 100 also may employ a video coder 150 and storage 160 to store compressed video until it is uploaded to the host computer via a communication port 180.

In a further use case, also illustrated in FIG. 1(b), the video sequence may be exchanged with another device as part of real time communication among the devices (ex., a videoconference). In this case, the device 100 may employ a video coder 150 to compress the video sequence and a transmitter 190 to transmit the compressed video to the other device by a wired or wireless communication connection. Although the compressed video typically is buffered prior to transmission, FIG. 1(a) illustrates the transmitter 190 receiving compressed video directly from the video coder 150 to represent that the video sequence need not be stored persistently by the device 100.

Figure 2:
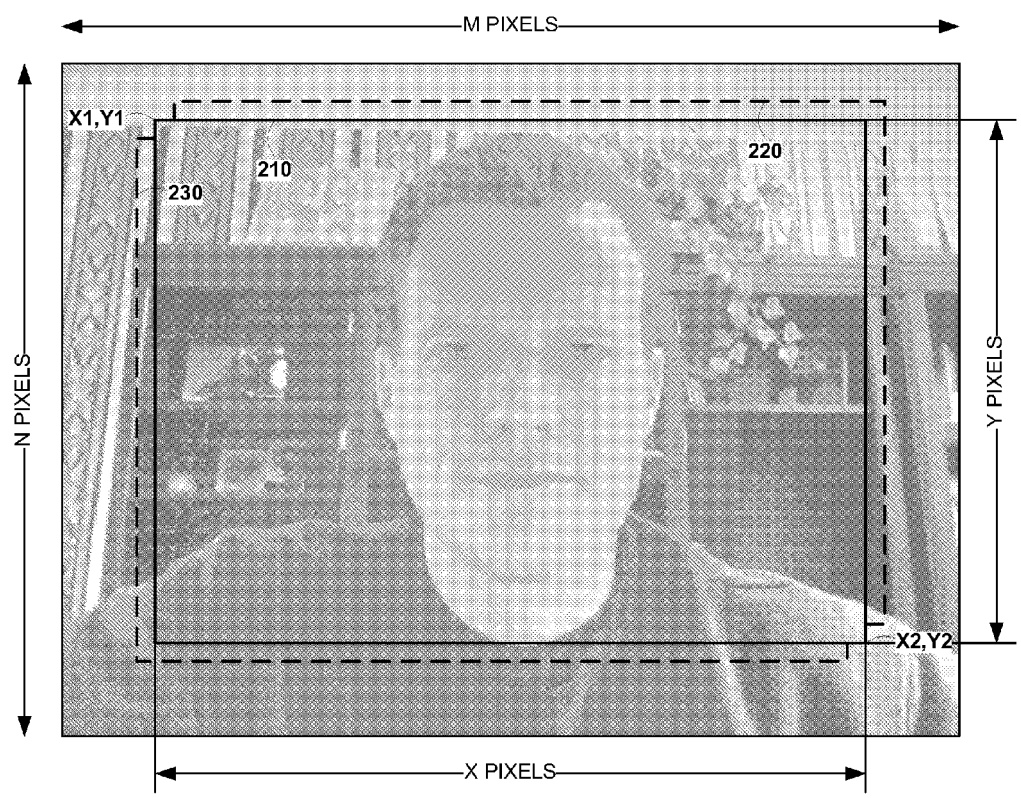
FIG. 2 illustrates a functional block diagram of a video processing system in an embodiment.

The video stabilizer 130 may perform video stabilization on source video using operational parameters that may be derived from a strength parameter input to it by the controller 140. FIG. 2 illustrates operation of the video stabilizer in the context of an exemplary frame of video data. In this example, the video stabilizer 130 may receive frames of video data at a predetermined size of M×N pixels and may extract a sub-frame from it at a size of X×Y pixels. The video stabilizer 130 may perform motions searches among the frames to recognize displacement of video content from frame to frame. The video stabilizer 130 may align extraction window with detected displacements in order to counteract them. Thus, in the example of FIG. 2, the video stabilizer 130 may define an extraction window 210 of size X×Y pixels at location X1,Y1 for the current frame. The video stabilizer 130 may define extraction windows 220,230 for other frames (frames not shown) at different locations depending on detected motion within the image content.

Embodiments of the present invention may adjust operational parameters of the video stabilizer (colloquially, its "strength") based on a strength parameter applied by the controller 140. For example, the size of the extraction window 210 may be varied based on the strength parameter. Generally speaking, a smaller extraction window allows for stronger video stabilization than a larger extraction window because it affords greater flexibility for the video stabilizer to move the extraction window within the M×N frame input to it by the camera. Similarly, a search window provided by the motion search operation may vary in size in response to the strength parameter. The size of the search window constrains an amount of motion that may be detected by the video stabilizer.

Figure 3:
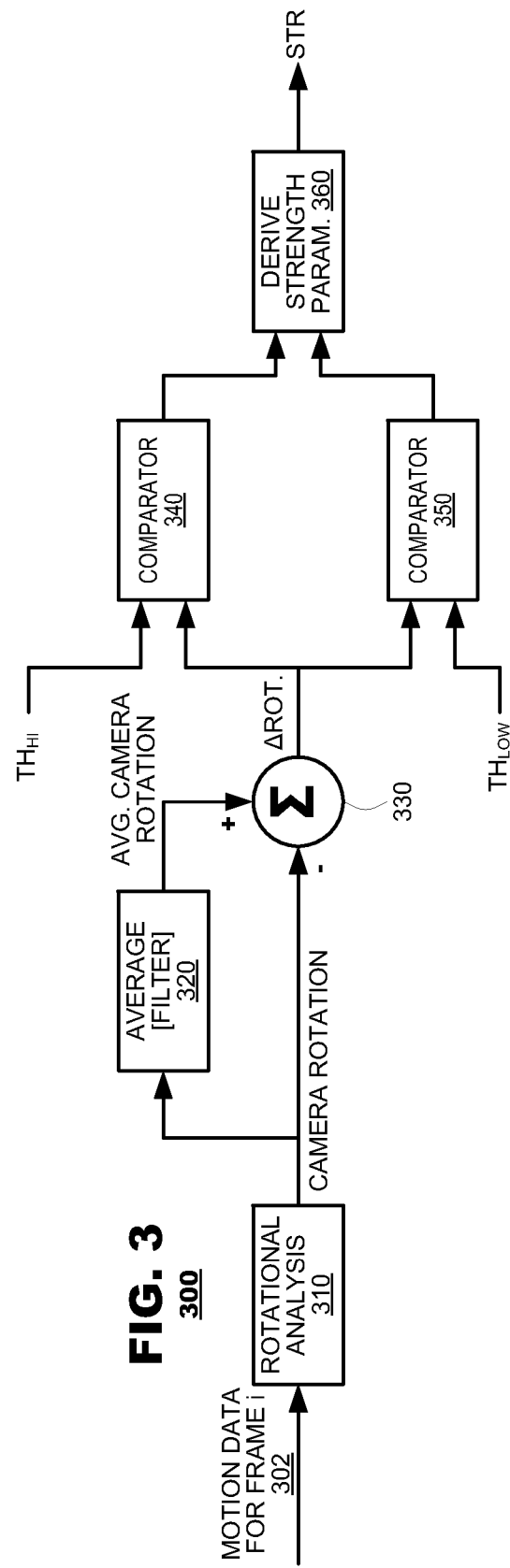
FIG. 3 illustrates an exemplary operation of a camera, gyroscopic unit, controller, and stabilizer in an embodiment.

FIG. 3 is a data flow diagram illustrating derivation of a strength parameter according to an embodiment of the present invention. When motion data 302 for a new frame i is derived, a controller may perform rotation analysis (box 310) on the motion data to determine rotational movement for the camera. The controller may determine an average camera motion (box 320) over a predetermined number of frames including the new frame i. Thereafter, the controller may calculate a motion difference ΔROT between the camera rotation at frame i and the average camera rotation for frame i (subtractor 330).

The controller may compare the motion difference ΔROT to a pair of thresholds $TH_{HI}$, $TH_{LOW}$ (boxes 340, 350) and may set a strength parameter based on the comparisons (box 360). In an embodiment, if the motion difference ΔROT is lower than $TH_{LOW}$, the controller may set the strength parameter to a maximum setting and, if the motion difference ΔROT is greater than $TH_{HI}$, the controller may set the strength parameter to a minimum setting. If the motion difference ΔROT falls between the two thresholds, then the controller may set the strength parameter to an intermediate setting based on the motion of the input frame i 302. The controller may calculate strength settings anew for each input frame and may output the strength settings to the video stabilizer for use in processing the input frames.

The motion data for input frame i 302 may include motion rate information: the rate at which the camera is being moved in, for example, each of 3 axis (x, y, and z). Rate information may be integrated to produce instantaneous position and rotation information (also in each of 3 axis). The rotation information may be quaternion data. In an embodiment, the rotational data may be analyzed to estimate the intended camera movement at the point in time when a corresponding video frame was captured. In order to do so, the rotational data may be extracted 310 from the motion data 302 and compared with an average of the rotational data 320 from a set of video frames. The set of video frames may be a set of the video frames captured prior to the currently processed frame. The average of the rotational data may represent an estimated intended position of the camera prior to the point in time when the current video frame was recorded. The average rotational data of the previous frames may be calculated by feeding the rotational data of the previous frames through a lowpass filter to eliminate high frequency components. The lowpass filter may be an infinite impulse response (IIR) lowpass filter. The rotational angle delta of the current frame may then be obtained by a subtractor 330 by subtracting the average rotational data from the current frame's rotational data. The rotational angle delta, ΔROT, may represent the intended camera movement for the current frame. Intended camera movement may include instances where the user holding the camera is panning the camera by rotating the camera on an axis. For example, a user may pan the camera to capture a video sequence of a moving car traveling past the user, while the user is stationary.

In an embodiment, the controller may compare the motion difference ΔROT to a pair of thresholds $TH_{HI}$, $TH_{LOW}$ (boxes 340, 350). In a further embodiment, the rotational angle delta, ΔROT, may be sent to a high threshold comparator 340, and a low threshold comparator 350. The high threshold comparator 340 may determine whether ΔROT is equal to, or above a particular threshold. The low threshold comparator 350 may determine whether ΔROT is equal to, or below a particular threshold. Information from the comparators 340 and 350, may be used to derive a strength parameter (box 360). The derived strength parameter may be used as input by video stabilizer 130 (FIG. 1). The purpose of video stabilization is to minimize the amount of unintentional shake, jerk, or high-frequency motion captured in video data (for example, as a result of the hand of the individual handling the camera shaking). A high strength parameter may be derived as a result of unintentional shake, and a low strength parameter may be derived as a result of intentional movement.

Figure 4:
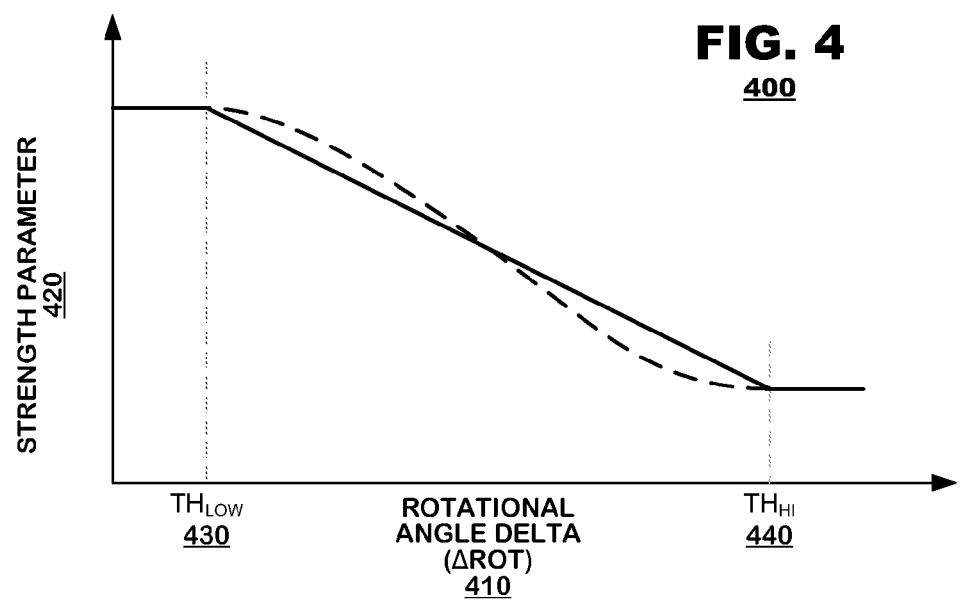
FIG. 4 shows an exemplary graph mapping video stabilization strengths to varying rotational angle delta in an embodiment.

FIG. 4 shows an exemplary graph 400 mapping different strength parameters to rotational angle delta, ΔROT, in an embodiment. On the x-axis of the graph is the rotational angle delta 410, and on the y-axis of the graph is the strength parameter 420. As seen in the graph, there are two threshold points, a low threshold ($TH_{LOW}$) 430, and a high threshold ($TH_{HI}$) 440. In an embodiment, when the rotational angle delta is lower than the low threshold 430, a constant high strength parameter may be derived. In other words, all frames with a rotational angle delta lower than the threshold have the same video stabilization strength applied. In an embodiment, when the rotational angle delta is higher than the high threshold 440, a constant low strength parameter may be derived. In an embodiment, the low threshold value 430 is always lower than the high threshold value 440. In an embodiment, if the rotational angle delta is between the high threshold and the low threshold, the strength parameter may be derived as a function of the rotational angle delta. In an embodiment, the function may be a linear function of the rotational angle delta. In another embodiment, the function may be a non-linear function, for example, an exponential function of the rotational angle delta. In an embodiment, the function may have a negative slope, i.e., the strength parameter may decrease as the rotational angle delta increases. In an embodiment, the function may be implemented as a mathematical calculation. In a further embodiment, the function may be implemented via a lookup table.

Figure 5:
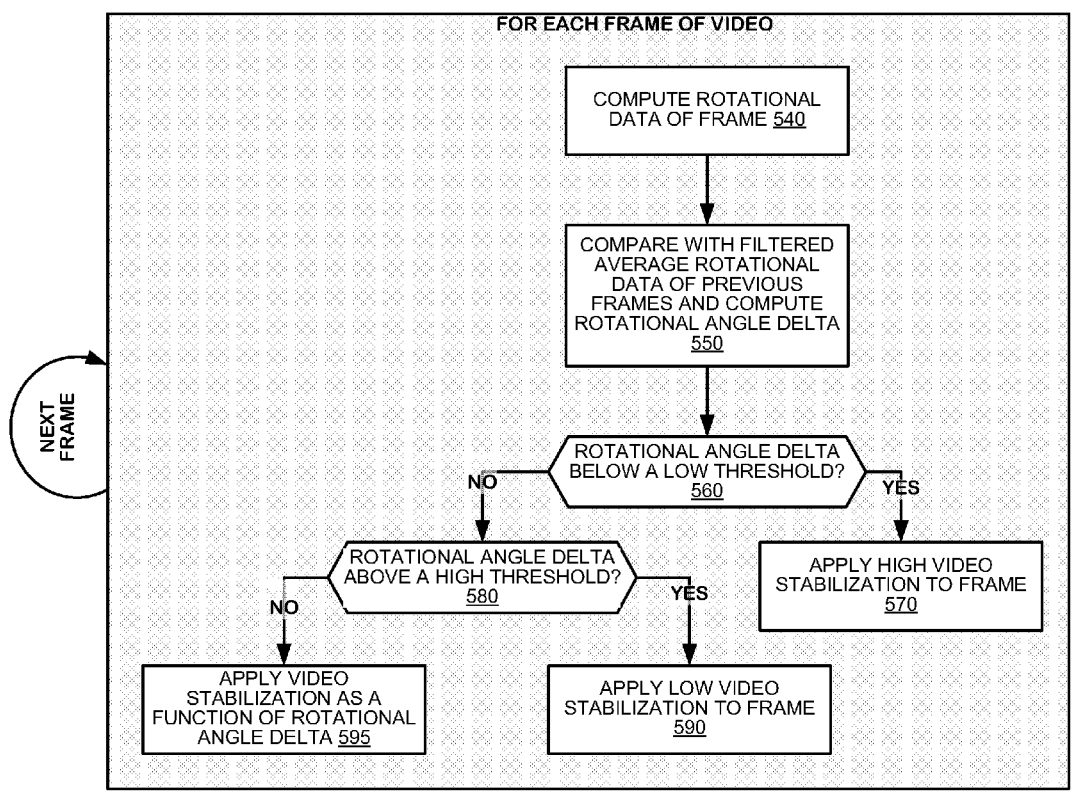
FIG. 5 illustrates a method for selectively applying stabilization to video frames in an embodiment.

FIG. 5 illustrates a method 500 for selectively applying stabilization to a frame of a video stream in an embodiment. For each sequential frame of a video stream, the rotational data of the currently processed frame is extracted and computed from motion data captured at approximately the same time at which the currently processed video frame was captured (box 540). The rotational data may be quaternion data. The rotational angle delta, ΔROT, of the currently processed frame is computed by comparing an average rotational data of a set of frames to the currently processed frame's rotational data (box 550). In an embodiment, the set of frames may be a set of video frames captured prior to the currently processed video frame. The average rotational data of the previous frames may be computed dynamically, where each currently processed frame's rotational data is used to update the average rotational data during each iteration. The average of the rotational data may represent an estimated intended position of the camera prior to the point in time when the current video frame was recorded. The average rotational data of the previous frames may be calculated by feeding the rotational data of the previous frames through a lowpass filter to eliminate high frequency components. The lowpass filter may be an infinite impulse response (IIR) lowpass filter. The rotational angle delta may be the difference between the average rotational data of the previous frames and the rotational data of the currently processed frame.

The rotational angle delta, ΔROT, may indicate the intended camera movement for the current video frame (for example, when a user pans the camera when capturing video). However, in certain instances, the rotational angle delta may be unintentional movement of the camera by the user such as minute shaking of the hands when holding a camera. The distinguishing factor between the unintentional and intentional camera movement may be the magnitude of rotational angle delta. In an embodiment, the rotational angle delta may be compared with a low threshold (box 560). If the rotational angle delta is below the low threshold (box 560), high video stabilization may be applied to the currently processed video frame (box 570). Low rotational angle delta may indicate that a user holding the camera did not intentionally move the camera, but rather the movement was caused by unintentional minor shake of the camera. In an embodiment, if the rotational angle delta is not below a low threshold, the rotational angle delta may be compared with a high threshold (box 580). If the rotational angle delta is above the high threshold (box 580), low video stabilization may be applied to the currently processed video frame (box 590). High rotational angle delta may indicate that a user holding the camera intentionally moved the camera, for example, panned the camera to capture a video of a moving object. In an embodiment, if the rotational angle delta is between the high threshold and the low threshold, stabilization may be applied as a function of the rotational angle delta (box 595). In an embodiment, the function may be a linear function of the rotational angle delta. In another embodiment, the function may be a non-linear function, for example, an exponential function of the rotational angle delta. In a further embodiment, the function may be implemented via a look up table.

Figure 6:
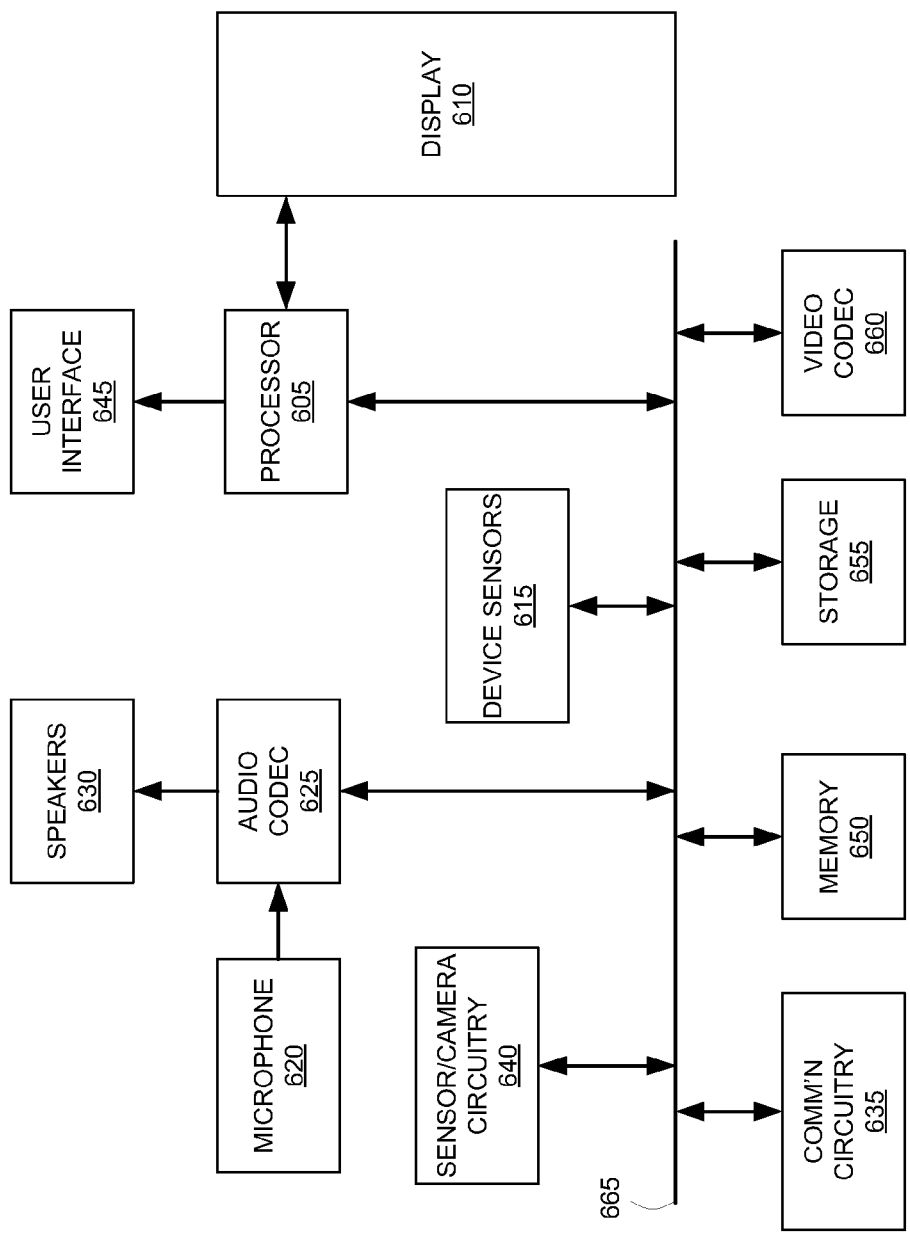
FIG. 6 is a simplified functional block diagram of an electronic device incorporating digital video capture capability according to one embodiment.

FIG. 6 is a simplified functional block diagram of representative electronic device 600 incorporating digital video capture capability is shown according to one embodiment. Electronic device 600 may include processor 605, display 610, device sensors 615 (e.g., gyro, accelerometer, proximity, and ambient light sensors), microphone 620, audio codec 625, speaker 630, communications circuitry 635, image sensor with associated camera and video hardware 640, user interface 645, memory 650, storage device 655, video codec(s) 660 and communications bus 665.

Processor 605 may be any suitable programmable control device or general or special purpose processor or integrated circuit and may execute instructions necessary to carry out or control the operation of many functions, such as the generation and/or processing of image metadata, as well as other functions performed by electronic device 600. Processor 605 may for instance drive display 610 and may receive user input from user interface 645. Processor 605 may also, for example, be a system-on-chip such as an application's processor such as those found in mobile devices or a dedicated graphics processing unit (GPU). Processor 605 may be based on reduced instruction-set computer (RISC) or complex instruction-set computer (CISC) architectures or any other suitable architecture and may include one or more processing cores.

Memory 650 may include one or more different types of storage media used by processor 605 to perform device functions. Memory 650 may include, for example, cache, read-only memory (ROM), and/or random access memory (RAM). Communications bus 660 may provide a data transfer path for transferring data to, from, or between at least storage device 655, memory 650, processor 605, and camera circuitry 640. User interface 645 may allow a user to interact with electronic device 600. For example, user interface 645 can take a variety of forms, such as a button, keypad, dial, a click wheel, or a touch screen.

Non-transitory storage device 655 may store media (e.g., image and video files), computer program instructions or software, preference information, device profile information, and any other suitable data. Storage device 655 may include one more storage mediums including, for example, magnetic disks (fixed, floppy, and removable) and tape, optical media such as CD-ROMs and digital video disks (DVDs), and semiconductor memory devices such as Electrically Programmable Read Only Memory (EPROM), and Electrically Erasable Programmable Read-Only Memory (EEPROM).

Video codec 660 may be a hardware device, a software module or a combination of hardware and software that enables video compression and/or decompression of digital video. For example, video codec 660 may implement the H.264 video standard. Communications bus 665 may be any one or more communication paths and employ any technology or combination thereof that is appropriate for the particular implementation.

Software may be organized into one or more modules and be written in any suitable computer programming language (or more than one language). When executed by, for example, processor 605 such computer program code or software may implement one or more of the methods described herein.

Various changes in the materials, components, circuit elements, as well as in the details of the illustrated operational methods are possible without departing from the scope of the following claims. For instance, processor 605 may be implemented using two or more program control devices communicatively coupled. Each program control device may include the above-cited processors, special purpose processors or custom designed state machines that may be embodied in a hardware device such as an application specific integrated circuit (ASIC) or a field programmable gate array (FPGA). In addition, the techniques disclosed herein may be applied to previously captured video sequences, providing the necessary metadata has been captured for each video frame.

In the above description, for purposes of explanation, numerous specific details have been set forth in order to provide a thorough understanding of the inventive concepts. As part of the this description, some structures and devices may have been shown in block diagram form in order to avoid obscuring the invention. Reference in the specification to "one embodiment" or "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system and business related constraints), and that these goals will vary from one implementation to another. It will also be appreciated that such development efforts might be complex and time consuming, but would nevertheless be a routine undertaking for those of ordinary skill in the digital video capture and processing field having the benefit of this disclosure.

It is to be understood that the above description is intended to be illustrative, and not restrictive. For example, the above described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain English equivalents of the respective terms "comprising" and "wherein."

I claim:

1. A video stabilization method, comprising, for a frame within a video sequence:
   responsive to motion sensor data associated with the video sequence:
      computing average motion of a camera, during a capture period about the frame;
      determining a difference between actual camera motion for the frame and the average camera motion;
      comparing the determined difference between the actual camera motion for the frame and the average camera motion to a plurality of thresholds;
      setting a video stabilization strength parameter for the frame based on the comparison of the determined difference of the respective frame to the plurality of thresholds; and
      performing video stabilization on the frame according to the frame's strength parameter.

2. The method of claim 1, wherein the video stabilization strength parameter is set to:
   a high strength value when the determined difference of the respective frame is below a first threshold of the plurality of thresholds,
   a low strength value when the determined difference of the respective frame is above a second threshold of the plurality of thresholds, and
   an intermediate value between the high and low strength value when the determined difference of the respective frame is above the first threshold and below the second threshold.

3. The method of claim 1, wherein the motion sensor data is derived from gyroscopic sensor data.

4. The method of claim 1, wherein the motion sensor data is derived from accelerometer sensor data.

5. The method of claim 1, wherein the motion sensor data is rotational data.

6. The method of claim 1, wherein computing the average motion includes filtering the motion sensor data.

7. The method of claim 1, wherein the camera is a portable electronic device.

8. The method of claim 2, wherein the intermediate value is based on a function of the determined difference for the frame.

9. A non-transitory machine-readable storage medium having program instructions, which when executed by a processor perform a method, the method comprising:
   computing average motion of a camera from motion sensor data associated with a video sequence, wherein the average motion is computed during a capture period about a frame in the video sequence;
   determining a difference between actual camera motion for the frame and the average camera motion;
   comparing the determined difference between the actual camera motion for the frame and the average camera motion to a plurality of thresholds;
   setting a video stabilization strength parameter for the frame based on the comparison of the determined difference of the respective frame to the plurality of thresholds; and
   performing video stabilization on the frame according to the frame's strength parameter.

10. The non-transitory machine-readable storage medium of claim 9, wherein the video stabilization strength parameter is set to:
    a high strength value when the determined difference of the respective frame is below a first threshold of the plurality of thresholds,
    a low strength value when the determined difference of the respective frame is above a second threshold of the plurality of thresholds, and
    an intermediate value between the high and low strength value when the determined difference of the respective frame is above the first threshold and below the second threshold.

11. The non-transitory machine-readable storage medium of claim 9, wherein the motion sensor data is derived from gyroscopic sensor data.

12. The non-transitory machine-readable storage medium of claim 9, wherein the motion sensor data is derived from accelerometer sensor data.

13. The non-transitory machine-readable storage medium of claim 9, wherein the motion sensor data is rotational data.

14. The non-transitory machine-readable storage medium of claim 9, wherein computing the average motion includes filtering the motion sensor data.

15. The non-transitory machine-readable storage medium of claim 9, wherein the camera is a portable electronic device.

16. The non-transitory machine-readable storage medium of claim 10, wherein the intermediate value is based on a function of the determined difference for the frame.

17. An apparatus comprising:
a processor for executing computer instructions, the computer instructions causing the processor to:
responsive to motion sensor data associated with a video sequence:
compute average motion of a camera, during a capture period about a frame within the video sequence;
determine a difference between actual camera motion for the frame and the average camera motion;
comparing the determined difference between the actual camera motion for the frame and the average camera motion to a plurality of thresholds;
set a video stabilization strength parameter for the frame based on the comparison of the determined difference of the respective frame to the plurality of thresholds; and
perform video stabilization on the frame according to the frame's strength parameter.

18. The apparatus of claim 17, wherein the video stabilization strength parameter is set to:
a high strength value when the determined difference of the respective frame is below a first threshold of the plurality of thresholds,
a low strength value when the determined difference of the respective frame is above a second threshold of the plurality of thresholds, and
an intermediate value between the high and low strength value when the determined difference of the respective frame is above the first threshold and below the second threshold.

19. The apparatus of claim 17, wherein the motion sensor data is derived from gyroscopic sensor data.

20. The apparatus of claim 17, wherein the motion sensor data is derived from accelerometer sensor data.

21. The apparatus of claim 17, wherein the motion sensor data is rotational data.

22. The apparatus of claim 17, wherein computing the average motion includes filtering the motion sensor data.

23. The apparatus of claim 17, wherein the camera is a portable electronic device.

24. The apparatus of claim 18, wherein the intermediate value is based on a function of the determined difference for the frame.

25. An apparatus comprising:
a camera to capture a video sequence;
a motion sensor to capture motion data associated with the video sequence;
a controller to:
compute average motion of the camera, during a capture period about a frame within the video sequence,
determine a difference between actual camera motion for the frame and the average camera motion,
compare the determined difference between the actual camera motion for the frame and the average camera motion to a plurality of thresholds; and
set a video stabilization strength parameter for the frame based on the comparison of the determined difference of the respective frame to the plurality of thresholds; and
a video stabilization unit to perform video stabilization on the frame according to the frame's strength parameter.

26. The apparatus of claim 25, wherein the video stabilization strength parameter is set to:
a high strength value when the determined difference of the respective frame is below a first threshold of the plurality of thresholds,
a low strength value when the determined difference of the respective frame is above a second threshold of the plurality of thresholds, and
an intermediate value between the high and low strength value when the determine difference of the respective frame is above the first threshold and below the second threshold.

27. The apparatus of claim 26, wherein the intermediate value is based on a function of the determined difference for the frame.

28. A non-transitory machine-readable storage medium storing video data generated according to a process, the process comprising:
capturing video data with a camera,
capturing motion sensor data with a motion sensor, and
processing the video data with a processor by:
computing, from the motion sensor data, average motion of a camera during a capture period about a frame from the video data;
determining a difference between actual camera motion for the frame and the average camera motion;
comparing the determined difference between the actual camera motion for the frame and the average camera motion to a plurality of thresholds;
setting a video stabilization strength parameter for the frame based on the comparison of the determined difference of the respective frame to the plurality of thresholds; and
performing video stabilization on the frame according to the frame's strength parameter; and
storing the stabilized video data on the storage medium.

29. A video stabilization method, comprising, for a frame within a video sequence:
responsive to motion sensor data associated with the video sequence:
computing average motion of a camera, during a capture period about the frame;
determining a difference between actual camera motion for the frame and the average camera motion;
comparing the determined difference between the actual camera motion for the frame and the average camera motion to at least one threshold;
setting a video stabilization strength parameter for the frame based on whether the determined difference of the respective frame is above the at least one threshold; and
performing video stabilization on the frame according to the frame's strength parameter.

30. The method of claim 29, wherein the video stabilization strength parameter is set to:

a high strength value when the determined difference of the respective frame is below a first threshold,
a low strength value when the determined difference of the respective frame is above a second threshold, and
an intermediate value between the high and low strength value when the determined difference of the respective frame is above the first threshold and below the second threshold.

31. The method of claim 29, wherein the motion sensor data is derived from gyroscopic sensor data.

32. The method of claim 29, wherein the motion sensor data is derived from accelerometer sensor data.

33. The method of claim 29, wherein the motion sensor data is rotational data.

34. The method of claim 29, wherein computing the average motion includes filtering the motion sensor data.

35. The method of claim 29, wherein the camera is a portable electronic device.

36. The method of claim 30, wherein the intermediate value is based on a function of the determined difference for the frame.

37. A non-transitory machine-readable storage medium having program instructions, which when executed by a processor perform a method, the method comprising:
computing average motion of a camera from motion sensor data associated with a video sequence, wherein the average motion is computed during a capture period about a frame in the video sequence;
determining a difference between actual camera motion for the frame and the average camera motion;
comparing the determined difference between the actual camera motion for the frame and the average camera motion to at least one threshold;
setting a video stabilization strength parameter for the frame based on the comparison of the determined difference of the respective frame to the at least one threshold; and
performing video stabilization on the frame according to the frame's strength parameter.

38. The non-transitory machine-readable storage medium of claim 37, wherein the video stabilization strength parameter is set to:
a high strength value when the determined difference of the respective frame is below a first threshold,
a low strength value when the determined difference of the respective frame is above a second threshold, and
an intermediate value between the high and low strength value when the determined difference of the respective frame is above the first threshold and below the second threshold.

39. An apparatus comprising:
a processor for executing computer instructions, the computer instructions causing the processor to:
responsive to motion sensor data associated with a video sequence:
compute average motion of a camera, during a capture period about a frame within the video sequence;
determine a difference between actual camera motion for the frame and the average camera motion;
comparing the determined difference between the actual camera motion for the frame and the average camera motion to at least one threshold;
set a video stabilization strength parameter for the frame based on the comparison of the determined difference of the respective frame to the at least one threshold; and
perform video stabilization on the frame according to the frame's strength parameter.

40. The apparatus of claim 39, wherein the video stabilization strength parameter is set to:
a high strength value when the determined difference of the respective frame is below a first threshold,
a low strength value when the determined difference of the respective frame is above a second threshold, and
an intermediate value between the high and low strength value when the determined difference of the respective frame is above the first threshold and below the second threshold.

41. The method of claim 29, wherein the video stabilization strength parameter is set to a first strength value when the determined difference is below a threshold of the at least one threshold and a second strength value when the determined difference is above the threshold.

42. The method of claim 41, wherein the first strength value is a predetermined constant strength value and the second strength values is a function of the difference value.

43. The method of claim 29, wherein the video stabilization strength parameter is set to a first strength value when the determined difference is above a threshold of the at least one threshold and a second strength value when the determined difference is below the threshold.

44. The method of claim 43, wherein the first strength value is a predetermined constant strength value and the second strength values is a function of the difference value.

45. The method of claim 29, wherein the video stabilization strength parameter is set to a predetermined constant strength value when the determined difference is below a threshold of the at least one threshold.

46. The method of claim 45, wherein the predetermined constant strength value is a maximum strength value.

47. The method of claim 29, wherein the video stabilization strength parameter is set to a predetermined constant strength value when the difference value is above a threshold of the at least one threshold.

48. The method of claim 47, wherein the predetermined constant strength value is a minimum strength value.

49. The method of claim 29, wherein the video stabilization strength parameter is set to a strength value that is a function of the determined difference when the difference value is above a threshold of the at least one threshold.

50. The method of claim 29, wherein the video stabilization strength parameter is set to a strength value that is a function of the difference value when the determined difference is below a threshold of the at least one threshold.

51. The method of claim 29, wherein the performing the video stabilization on the frame according to the frame's strength parameter includes setting a size of an extraction window for the frame as a function of the frame's strength parameter.

52. The method of claim 29, wherein the performing the video stabilization on the frame according to the frame's strength parameter includes setting a size of a search window of a motion search operation for the frame as a function of the frame's strength parameter.

53. The non-transitory machine-readable storage medium of claim 37, wherein the video stabilization strength parameter is set to a predetermined constant strength value when the determined difference is below a threshold of the at least one threshold.

54. The non-transitory machine-readable storage medium of claim 37, wherein the video stabilization strength parameter is set to a predetermined constant strength value when the determined difference is above a threshold of the at least one threshold.

55. The non-transitory machine-readable storage medium of claim 37, wherein performing the video stabilization on the frame according to the frame's strength parameter includes setting a size of an extraction window for the frame as a function of the frame's strength parameter.

56. The non-transitory machine-readable storage medium of claim 37, wherein performing the video stabilization on the frame according to the frame's strength parameter includes setting a size of a search window of a motion search operation for the frame as a function of the frame's strength parameter.

57. The apparatus of claim 39, wherein the video stabilization strength parameter is set to a predetermined constant strength value when the determined difference is below a threshold of the at least one threshold.

58. The apparatus of claim 39, wherein the video stabilization strength parameter is set to a predetermined constant strength value when the determined difference is above a threshold of the at least one threshold.

59. The apparatus of claim 39, wherein performing the video stabilization on the frame according to the frame's strength parameter includes setting a size of an extraction window for the frame as a function of the frame's strength parameter.

60. The apparatus of claim 39, wherein performing the video stabilization on the frame according to the frame's strength parameter includes setting a size of a search window of a motion search operation for the frame as a function of the frame's strength parameter.

* * * * *